Nov. 4, 1947.  R. BRANSKY  2,430,325
GATE CONSTRUCTION AND OPERATING UNIT THEREFOR
Filed June 15, 1945
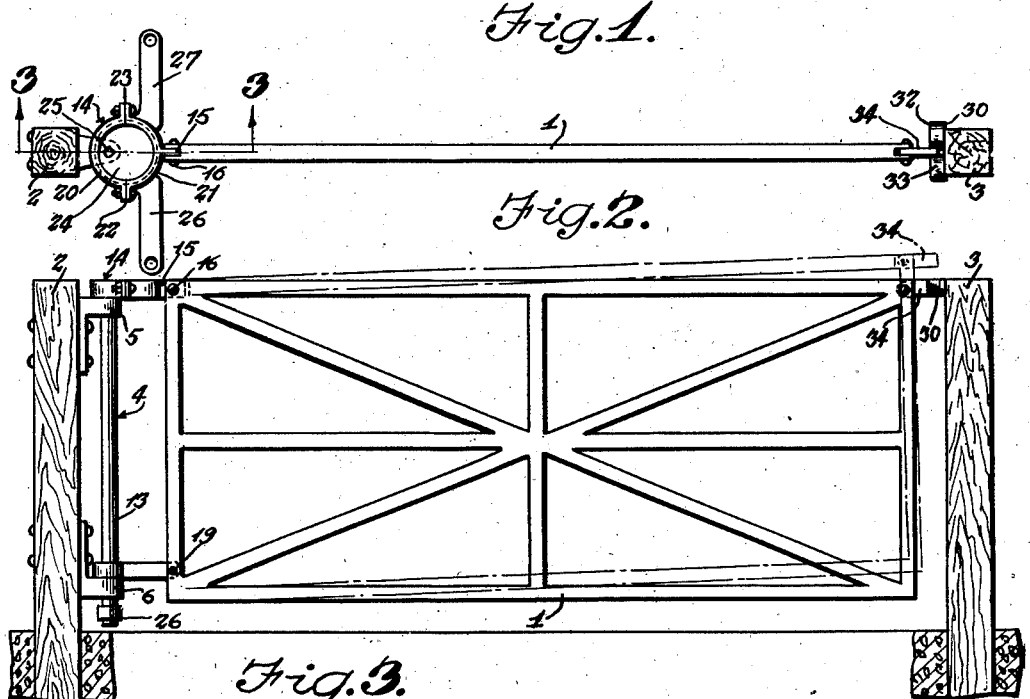
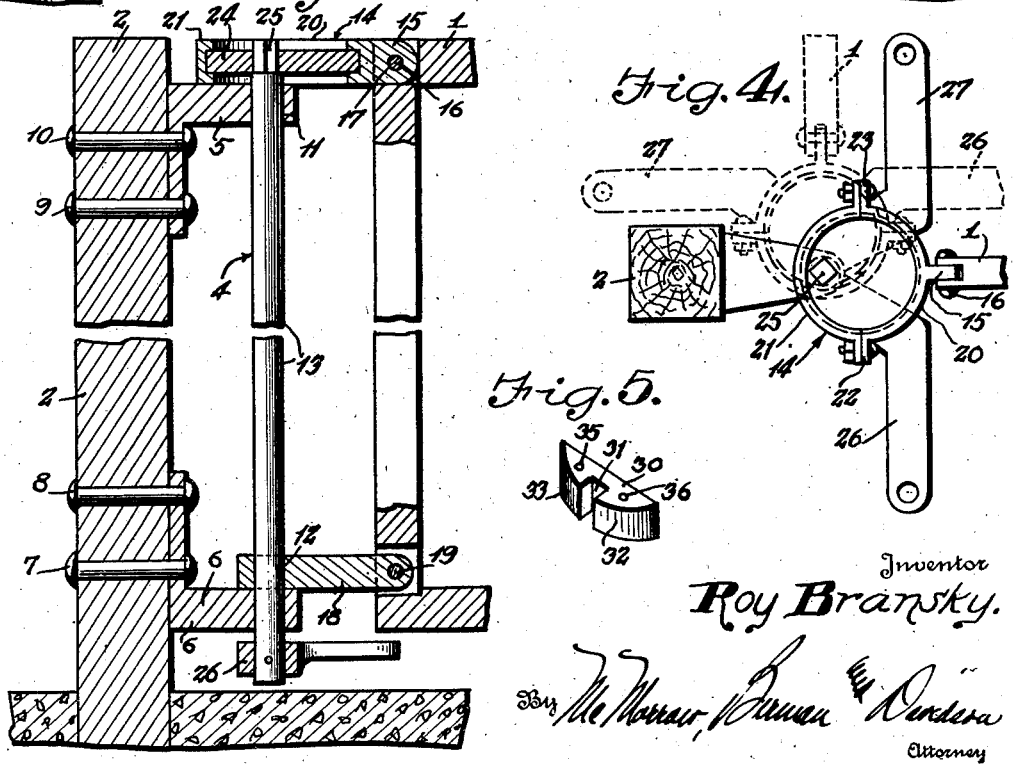
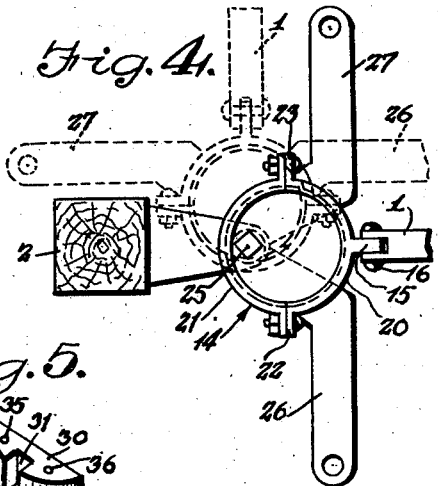
Inventor
Roy Bransky.

Patented Nov. 4, 1947

2,430,325

UNITED STATES PATENT OFFICE 2,430,325

GATE CONSTRUCTION AND OPERATING UNIT THEREFOR

Roy Bransky, Hood River, Oreg.

Application June 15, 1945, Serial No. 599,669

4 Claims. (Cl. 39—35)

It is an object of this invention to provide a gate construction including a latch feature and an operating unit for the gate and latch whereby the unit may be operated without dismounting from a vehicle or the like.

It is more particularly an object of this invention to provide an operating means or unit connected directly with the gate and one of the associated gate posts, which operating means supports, lifts and tilts the gate and thereby displaces the center of gravity of the gate and causes the gate to swing by the force of gravity.

It is also an object of this invention to provide a gate, a gate latch and an operating unit for the gate in combination with a gate-supporting post and an associated latch-supporting post.

Other objects and advantages will be revealed as the detailed description is presented in connection with the accompanying drawings which illustrate one embodiment of my invention.

In the drawings:

Figure 1 is a plan view of my new invention,

Figure 2 is a side elevation of my invention depicting in dot-and-dash lines how the gate is elevated and tilted initially at the beginning of the opening movement of the gate, Figure 3 is a fragmentary foreshortened vertical section of my new operating unit as taken on the line 3—3 of Figure 1 looking in the direction of the arrows, Figure 4 is a fragmentary plan view on an enlarged scale of the major portion of my new operating unit showing the open gate position by interrupted lines and the closed gate position by full lines, and Figure 5 is a perspective view of the keeper element of the latch feature.

In the specification and drawing, the reference characters identify the essential details of my novel construction and combination of parts and features.

The gate 1 is located between two cooperative gate posts 2 and 3. The post 2 supports the operating unit 4 through the medium of bracket means or elements, 5 and 6 secured by suitable fastening means 7, 8, 9, 10 to the post 2. The brackets 5 and 6 have horizontal arms which are arranged in substantially vertical alignment and these arms are provided with substantially aligned vertical bores 11 and 12 which receive the vertical rotatable shaft 13.

The unit-supported end of the gate 1 is provided on its upper corner with a collar or ring 14 having a laterally extending lug 15 articulately secured to said upper corner by a bolt or rivet 16 which passes through a bifurcated portion of said gate and an aperture 17 of the lateral lug 15. The articulate connection provides for a limited relative movement of gate and ring to be explained fully subsequently herein, including its uses and functions.

The lower corner of the same end of the gate 1 is provided with a link 18 having one end thereof journaled on the shaft 13, as clearly indicated at 12 in Figure 3, the opposite end of the link 18 is articulately connected to the lower corner of the gate 1 by a cross pin 19 passing through an apertured slotted portion of the gate 1 and the transversely apertured end of the link 18. The articulate connection at 19 provides for free limited movement of the gate 1 on the end of the link at 19 as the gate 1 is pulled into slightly tilted position by the operating unit. The link 18 defines a means to maintain the lower corner of the gate 1 a fixed distance from the shaft 13 at the position of the link 18 on the shaft 13. The link 18 includes the idea of a fixed radius which controls movement in a true arc of a circle.

The ring 14 is internally grooved and is made up in sections 20 and 21 having radial pairs of lugs 22 and 23 secured together by bolts, as clearly disclosed on the drawing. When the sections 20 and 21 are sufficiently separated the circumferential edge of the disc 24 is received in the grooves of the sections 20 and 21 and maintained and supported therein for rotative movement.

The disc 24 is provided off center with an aperture having a square cross-section to receive the squared upper end portion 25 of the shaft 13. The lower end portion of the shaft 13 is provided with means 26 and 27 to operate the shaft 13 and through the medium of the shaft, disc and ring serves to tilt the gate 1 and lift the latch end of the gate, as clearly indicated in dot-and-dash lines in Figure 2.

The post 3 is provided with a keeper 30 having a vertically located slotted or notched portion 31 flanked by inclined surface portions 32 and 33. The latch end of the gate 1 is provided with a swinging latch bolt 34. The latch bolt 34 is pivoted within a slot on the gate 1 to swing upwardly above a horizontal line to an elevation sufficient to pass slidingly upwardly over the inclined surface portion 32 or 33 when the gate 1 swings to a closed position. The walls of the slot in the gate provide stops in the path of the latch 34 to prevent it from swinging upwardly beyond its center of gravity and thereby assure that the gravity-actuated latch bolt 34 will always be in latching position when the gate 1 is swinging to closed position.

The keeper 30 is provided with apertures 35 and 36 substantially parallel to the notch 31 whereby the keep 30 may be secured or fastened on the post 3 in the path of the swinging or pivoted latch bolt 34.

Operation of the device is readily understood from the foregoing detailed description. It is to be noted that the rotation of the shaft 13 and its eccentric disc or cam 24 is produced by the crank arms 26 and 27 or other suitable means (not shown). I have not invented a particular means for actuating the cranks or equivalent means to successively rotate the shaft 13, since I have contemplated that any suitable actuating means to suitably rotate the shaft 13 through an arc at least an amount slightly or sufficiently in excess of 180°, or in excess of 90° in either direction from the closed position of the gate 1. When the gate 1 is in closed position, the high point of the eccentric or cam 24 is in alignment with the gate 1 and the axis of the shaft 13, so that when the shaft 13 and cam 24 are rotated in a counter clockwise direction, the latch and the latch end of the gate 1 will be lifted from the notch 31 of the keeper 30 and at the same time the gate 1 is tilted laterally to shift the center of gravity of the gate so that the gate swings in a counter clockwise direction, of course, the friction of the rotating cam in the ring 14 also assists the swinging of the gate in the same direction. When the cam 24 has rotated in excess slightly of 90°, it is stopped and the gate through the force of gravity and its own momentum swings to a completely open position.

To close the gate the cam 24 is rotated clockwise to its initial position and then the gate swings to closed position.

Since the gate ie not in an elevated position as it closes, the latch bolt 34 rides up over the inclined cam surface 32 of the keeper 30 and drops by gravity into the notch 31.

In this connection it is to be noted that the articulate connections at 15, 16, 17 and 19 are sufficiently loose to prevent any binding action when the gate is lifted at its latch end and tilted laterally by the cam or eccentric 24.

Having fully described my invention, it is nevertheless contemplated that changes in detail may be made within the range or scope of the subject matter claimed.

What I claim is:

1. In a gate-operating means, the substructure comprising a sectional ring having internal grooves in combination with a disc embraced by said grooved sections when said sections are secured together, said disc being rotatably in the ring, in further combination with a shaft arranged at right angles to said disc and one end portion of said shaft being fixedly secured to said disc in an off center position, said ring having on one of its sections a gate-supporting lug.

2. In a gate-operating unit, the substructure comprising a shaft adapted to be arranged in a substantially vertical position and adapted to be supported in a vertical position by brackets journaled on said shaft, a disc fixedly secured on one end portion of said shaft in an off center position at substantially a right angle to said shaft, an operating arm fixedly mounted on the opposite end portion of said shaft, a link journaled on said shaft remote from said disc, said unit having a sectional ring provided with an internal groove embracing the edge portion of said disc, said disc and ring having relative rotative relation, one section of said ring having a laterally projecting apertured lug whereby the ring may be secured to the end of a gate, the link also having an apertured portion remote from its journaled portion whereby said link may be suitably secured to the end of a gate in substantial alignment with the laterally extending lug of said ring.

3. In a gate structure, a pair of posts, a vertical shaft journaled on one of said posts, means for turning said shaft, a link mounted adjacent the lower end of the shaft, a gate frame pivoted at the inner of its lower corners about a horizontal axis to one end of said link, a disc eccentrically fixed on the upper end of said shaft, a ring mounted for relative rotation on said disc pivoted to the inner upper corner of said gate frame on a horizontal axis, a latch pivoted on a horizontal axis to the outer free upper corner of said gate frame and a notched keeper having outwardly and downwardly inclined surfaces extending from the notch.

4. A gate construction comprising the combination of a gate and gate posts, one of said posts being located at each end of the gate, the post at one end of the gate having an operating unit secured to said post, one end of the gate being mounted on said unit for limited tilting movement relative to said unit, the opposite end of said gate being free and provided with a slot carrying a pivoted latch bolt, the walls of said slot forming stops located on the free end of the gate in the path of the pivoted bolt to limit the movement of the latch bolt from a horizontal position to an elevated position in an arc of less than 90°, the post at the free end of the gate supporting a notched keeper located in the path of the pivoted latch bolt whereby said gate may be maintained in a closed position until the free end of the gate and its pivoted latch bolt are lifted by the operating unit, said operating unit comprising a ring, a disc rotatively mounted in the ring in combination with a shaft mounted to be rotated in a vertical axis, the upper end portion of said shaft being fixedly secured in an off-center position to said disc, whereby the rotation of the shaft and disc will lift the free end of the gate and simultaneously tilt the gate laterally.

ROY BRANSKY.

REFERENCES CITED

The following references are of record in the file of this patent:

UNITED STATES PATENTS

| Number | Name | Date |
| --- | --- | --- |
| 866,139 | Jordan | Sept. 17, 1907 |
| 1,430,851 | Richardson | Oct. 3, 1922 |